United States Patent
Shoda et al.

(10) Patent No.: US 9,738,252 B1
(45) Date of Patent: Aug. 22, 2017

(54) DRIVER SEAT FOR OPERATOR AND DUMP TRUCK INCLUDING THE SAME

(71) Applicant: Komatsu Ltd., Minato-ku, Tokyo (JP)

(72) Inventors: Takuma Shoda, Tokyo (JP); Shunsuke Nishida, Tokyo (JP); Hirofumi Wada, Tokyo (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 15/307,107

(22) PCT Filed: Aug. 12, 2016

(86) PCT No.: PCT/JP2016/073802
§ 371 (c)(1),
(2) Date: Oct. 27, 2016

(87) PCT Pub. No.: WO2016/208778
PCT Pub. Date: Dec. 29, 2016

(51) Int. Cl.
*B60R 22/48* (2006.01)
*B60R 22/34* (2006.01)
*B60P 1/04* (2006.01)

(52) U.S. Cl.
CPC .............. *B60R 22/48* (2013.01); *B60P 1/04* (2013.01); *B60R 22/34* (2013.01)

(58) Field of Classification Search
CPC ............ B60R 22/48; B60R 22/34; B60P 1/04
See application file for complete search history.

(56) References Cited

U.S. PATENT DOCUMENTS

| 8,902,074 | B2 * | 12/2014 | Landry | A62B 35/0018 |
| | | | | 182/3 |
| 2002/0008376 | A1 * | 1/2002 | Wittenberg | B60R 22/12 |
| | | | | 280/801.1 |
| 2003/0160497 | A1 * | 8/2003 | Darr | B60R 22/321 |
| | | | | 297/468 |
| 2004/0079575 | A1 | 4/2004 | Herberg et al. | |

(Continued)

FOREIGN PATENT DOCUMENTS

| CN | 105774743 | 7/2016 |
| JP | 2012-056350 | 3/2012 |
| JP | 2014-177260 | 9/2014 |

OTHER PUBLICATIONS

Written Opinion of the International Searching Authority in International Application No. PCT/JP2016/073802, mailed Sep. 13, 2016, 10 pages, with English translation.

(Continued)

*Primary Examiner* — Darlene P Condra
(74) *Attorney, Agent, or Firm* — Fish & Richardson P.C.

(57) ABSTRACT

A driver seat for an operator includes: a fastener configured to fasten a pair of hip belts; a pair of shoulder belts each having a distal end attached to each of the pair of hip belts, the pair of shoulder belts being configured to hold a shoulder area of the operator; and a fastened-state detector configured to detect whether or not the fastener is fastened. The fastened-state detector includes: a detector main body configured to detect whether or not the fastener is fastened through electrical continuity; a signal line connected to the detector main body; and a bag-shaped section integrated with one of the pair of shoulder belts in a drawing direction of the shoulder belt, the bag-shaped section housing the signal line.

5 Claims, 10 Drawing Sheets

(56) References Cited

U.S. PATENT DOCUMENTS

| | | | |
|---|---|---|---|
| 2007/0182534 A1* | 8/2007 | Gregory | B60R 22/48 340/457.1 |
| 2014/0052342 A1* | 2/2014 | Seibert | B60N 2/002 701/45 |
| 2014/0265292 A1 | 9/2014 | Nagasawa, Sr. | |
| 2014/0300154 A1 | 10/2014 | Pfister | |
| 2014/0303851 A1* | 10/2014 | Nagasawa, Sr. | B60R 21/01544 701/45 |
| 2015/0360643 A1* | 12/2015 | Cech | B60R 22/48 297/217.3 |
| 2016/0016534 A1 | 1/2016 | Nagasawa | |

OTHER PUBLICATIONS

Office Action from corresponding Chinese Application No. 201680001263.1, dated May 5, 2017, 7 pages, with English translation.

* cited by examiner

DRIVER SEAT FOR OPERATOR AND DUMP TRUCK INCLUDING THE SAME

CROSS-REFERENCE TO RELATED APPLICATIONS

This application claims priority to International Application No. PCT/JP2016/073802 filed on Aug. 12, 2016, the contents of which are incorporated herein in their entirety.

TECHNICAL FIELD

The present invention relates to a driver seat for an operator of a working vehicle and a dump truck including the same.

BACKGROUND ART

Heretofore, a working vehicle such as a large wheel loader and a dump truck operating on unstable surfaces of ground at a dig site in a mine or the like includes a driver seat provided with a seat belt in view of securing safety of an operator.

Additionally, a racing car (automobile) is provided with a four-point seat belt in order to more firmly hold a driver in some cases (see, for instance, Patent Literature 1).

Since the working vehicle operating on unstable surfaces of ground at a dig site is likely to overturn, it is desired that the working vehicle is provided with a four-or-more point seat belt.

CITATION LIST

Patent Literature(s)

Patent Literature 1 JP-A-2014-177260

SUMMARY OF THE INVENTION

Problem(s) to be Solved by the Invention

In a conventional working vehicle, a seat belt warning light which is turned on/off depending on a wearing state of a seat belt is disposed on an instrument panel so that an operator checks whether or not the seat belt is fastened.

However, when using a four-or-more point seat belt, a buckle is worn on a middle portion of an abdomen of the operator. Accordingly, it becomes difficult to install a signal line for turning on/off the seat belt warning light while establishing both of excellent appearance and durability of the seat belt.

An object of the invention is to provide a driver seat for an operator that makes it possible to check a wearing state of a seat belt even when the driver seat is provided with a four-or-more point seat belt, and a dump truck including the driver seat.

Means for Solving the Problem(s)

A driver seat for an operator provided to a working vehicle according to the invention includes: a seat section on which an operator of the working vehicle sits; a backrest erected at the back of the seat section, configured to support a back of the operator sitting on the seat section; a pair of first retractors provided to left and right sides of the seat section; a pair of hip belts each having a proximal end connected to each of the pair of first retractors, the pair of hip belts being configured to hold a hipbone area of the operator; a fastener configured to fasten the pair of hip belts; a pair of second retractors provided to a rear surface of the backrest; a pair of shoulder belts each having a proximal end connected to each of the pair of second retractors and a distal end attached to each of the pair of hip belts, the pair of shoulder belts being configured to hold a shoulder area of the operator; and a fastened-state detector configured to detect whether or not the fastener is fastened. The fastened-state detector includes: a detector main body configured to detect whether or not the fastener is fastened through electrical continuity; a signal line connected to the detector main body; and a bag-shaped section integrated with one of the pair of shoulder belts in a drawing direction of the shoulder belt, the bag-shaped section housing the signal line.

In the above arrangement, it is preferable that the driver seat further includes a pair of guide members each having a groove-shaped hole through which the shoulder belt passes and the guide members are provided to an upper portion of the backrest. An enlarged section through which the bag-shaped section passes is preferably provided to the groove-shaped hole of one of the guide members.

In the above arrangement, the bag-shaped section is preferably integrated with the shoulder belt at a position that the shoulder belt is wound by the second retractor to the greatest extent possible.

In the above arrangement, it is preferable that the driver seat for an operator further includes a conduit housing a signal line separated from the bag-shaped section and the conduit is provided to the rear surface of the backrest. The conduit is preferably configured to be movable in accordance with a drawing operation or a winding operation of the shoulder belt.

A dump truck according to the invention includes any one of the above-described driver seats for an operator.

DESCRIPTION OF EMBODIMENT(S)

Exemplary embodiment(s) of the invention will be described below with reference to the attached drawings.

1. Overall Structure of Dump Truck 1

Figure 1:
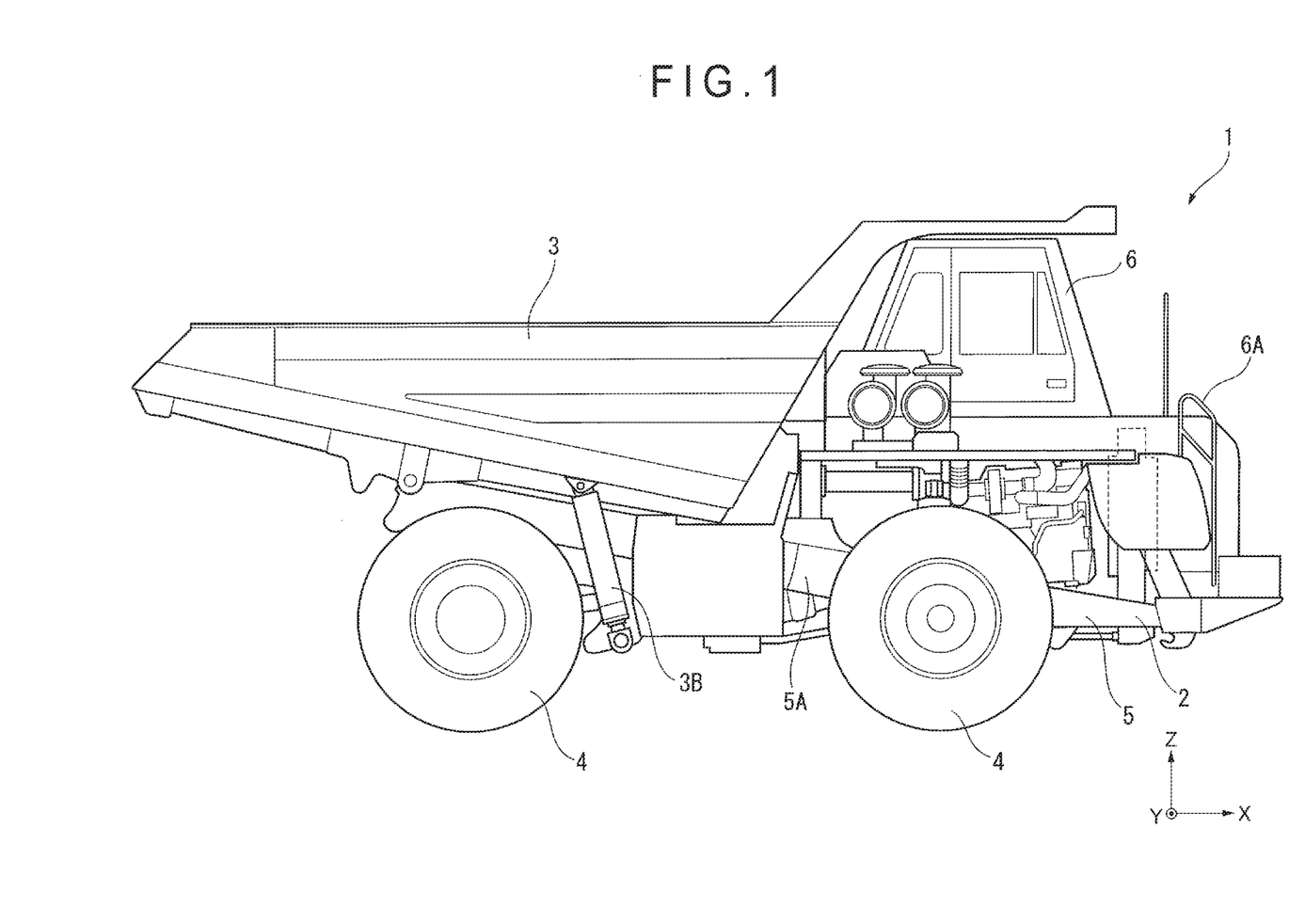
FIG. 1 is a side view of a working vehicle according to an exemplary embodiment of the invention.
Figure 2:
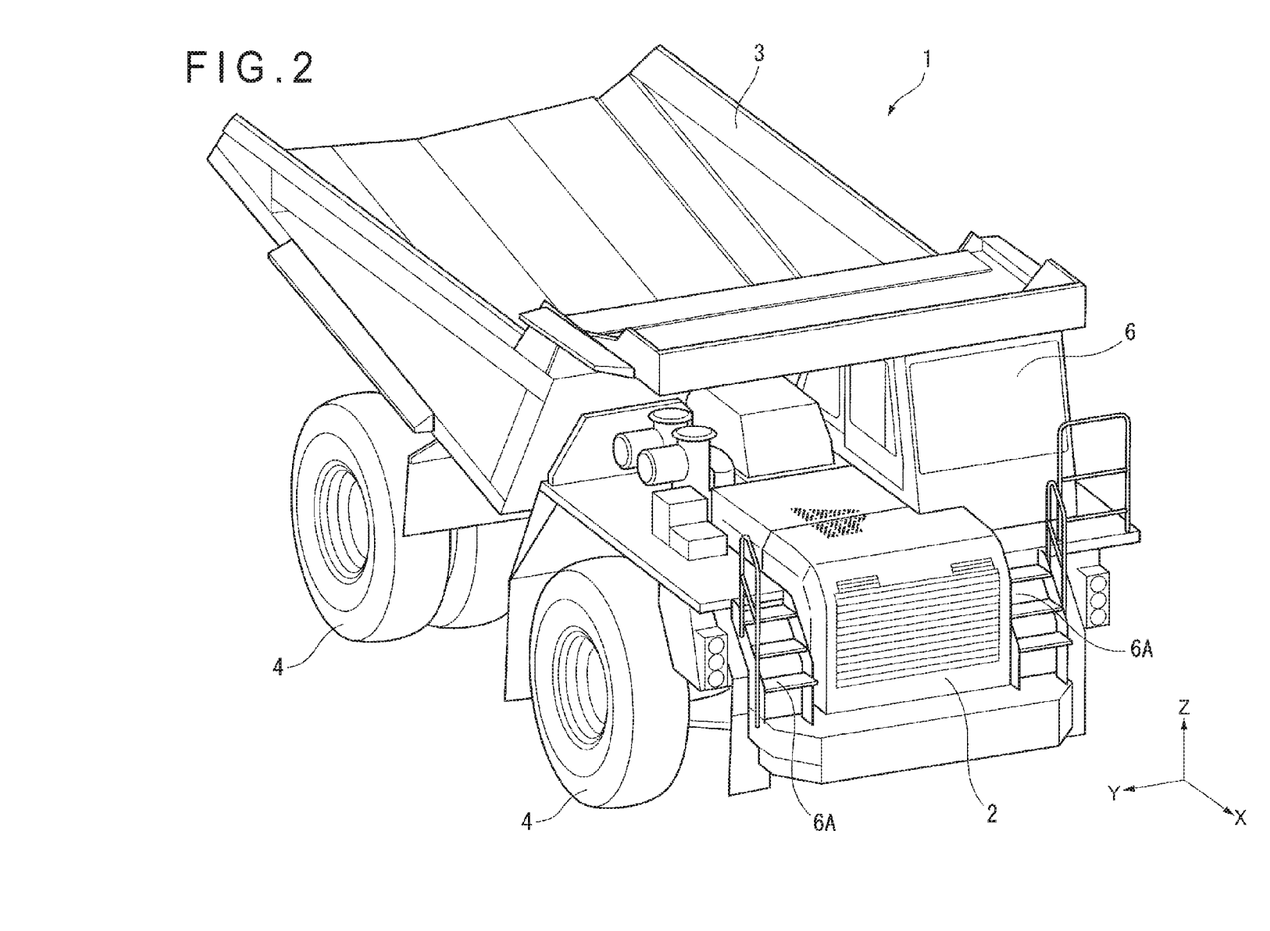
FIG. 2 is a perspective view of the working vehicle according to the exemplary embodiment.

FIGS. 1 and 2 illustrate a dump truck 1 of an exemplary embodiment of the invention. FIG. 1 is a side view of the dump truck 1 as viewed in a width direction thereof perpendicular to a travel direction thereof. FIG. 2 is a perspective view of the dump truck 1 as viewed from above.

It is to be noted that an X axis, a Y axis and a Z axis are perpendicular to each other in each figure according to the exemplary embodiment. According to the exemplary embodiment, for the purpose of illustration, FIG. 1 is taken as a standard view, in which an advancing direction of the dump truck 1 represents a direction indicated by an arrow oriented in the X axis, a vehicle-width direction of the dump truck 1 from left to right represents a direction indicated by an arrow oriented in the Y axis, and an upward vertical direction with respect to the ground represents a direction indicated by an arrow oriented in the Z axis. Further, in the below exemplary embodiments, sometimes, the travel direction is referred to as "front", the direction opposite to the travel direction is referred to as "back", the vehicle-width direction toward the right is referred to as "right" and the vehicle-width direction toward the left is referred to as "left".

The dump truck 1 is a working vehicle configured to convey loaded substances such as earth and sand at a dig site in a mine or the like, and includes a chassis 2 and a dump body 3.

The chassis 2 is supported by four tires 4 through a suspension. The tires 4 include two pairs of tires each including two tires provided on both ends in the vehicle-width direction, each of the pairs of the tires being arranged along the travel direction. The dump truck 1 may include left and right rear tires that are double tires.

The chassis 2 includes a frame 5. The frame 5 has a pair of side members 5A extending along edges in a width direction of the frame 5, and a plurality of cross members extending along the vehicle-width direction and configured to connect the pair of side members 5A to each other.

A dump body 3 is attached to the back of the chassis 2 through a hinge (not shown in the drawing) so that the dump body 3 can move up and down. A cab 6 as a driver seat is provided at the front left side above the chassis 2. The cab 6 may be provided above the center of the chassis 2 in the width direction.

As shown in FIG. 2, the dump body 3 has a rectangular loading space, and is attached to the chassis 2 so as to be revolvable about the hinge. The dump body 3 moves up and down with respect to the chassis 2 when hoist cylinders 3B each provided at the rear portion of the chassis 2 extends and retracts so as to discharge the loaded substances such as earth and sand.

As shown in FIG. 2, the cab 6 functions as a driver seat for an operator to get on and drive the dump truck 1. The operator goes up and down a ladder 6A provided to the front side of the dump truck 1 so as to get on and off the cab 6.

Figure 3:
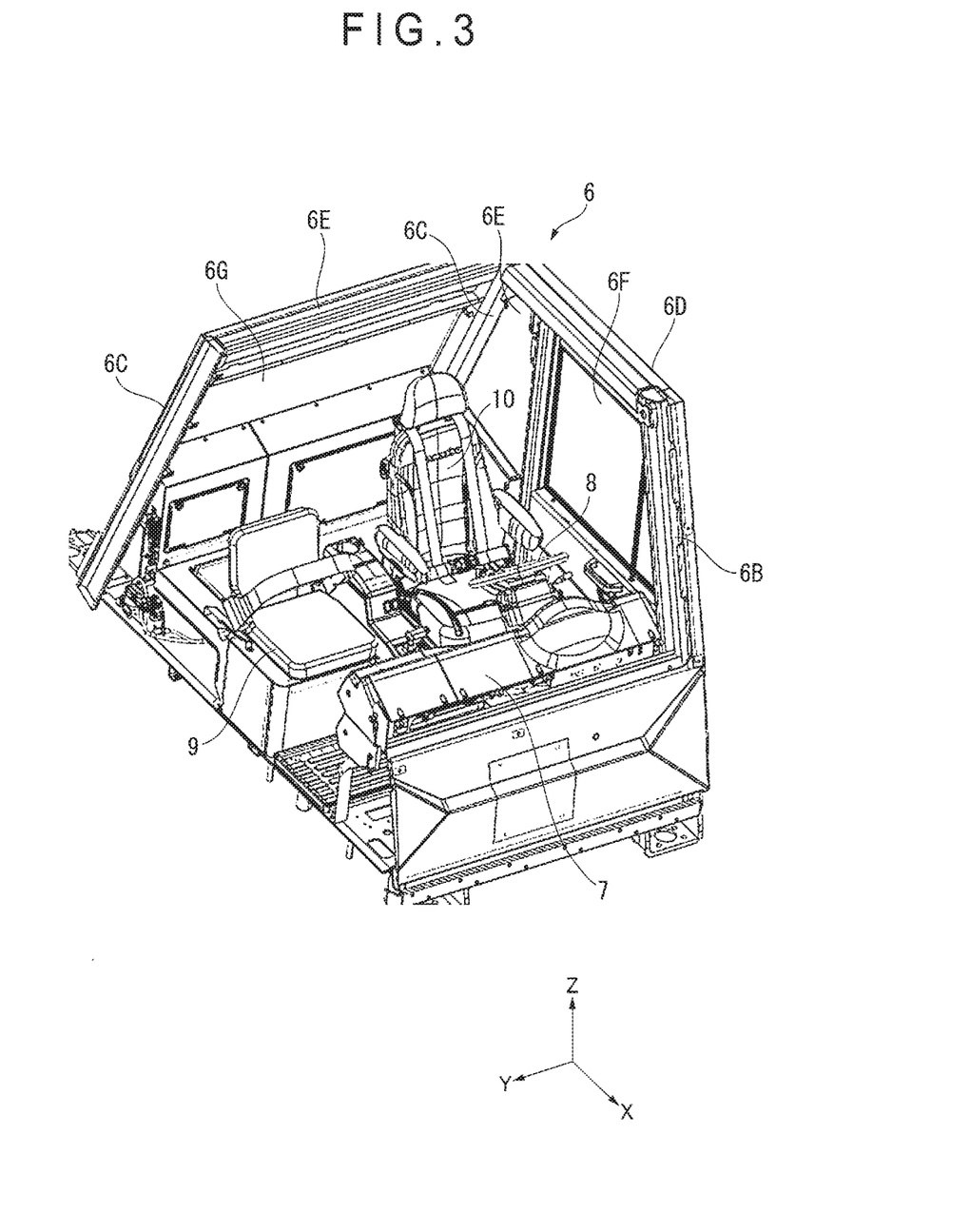
FIG. 3 is a perspective view illustrating an internal structure of a cab of the working vehicle according to the exemplary embodiment.

FIG. 3 illustrates an internal structure of the cab 6 of the dump truck 1. Incidentally, part of the internal structure of the cab 6 of the dump truck 1 is omitted in FIG. 3. The cab 6 is provided with a cage including front pillars 6B, rear pillars 6C, roof side rails 6D and a rear roof rail 6E in combination.

The front pillar 6B is, for example, a rectangular steel tube, and erected at front left and right corners of the cab 6. Although not shown in the drawing, a front window is fitted to the front pillars 6B through a gasket.

The rear pillar 6C is, for example, a rectangular steel tube, and erected at rear left and right corners of the cab 6.

The roof side rail 6D connects an upper and of the front pillar 6B and an upper and of the rear pillar 6C. A side window 6F is fitted into a lower portion of the roof side rail 6D through a gasket.

The rear roof rail 6E connects upper ends of the left and right rear pillars 6C. A rear panel 6G is fitted into a lower portion of the rear roof rail 6E.

Additionally, a roof panel is attached to the roof side rails 6D, the rear roof rail 6E and a front side rail (not shown in the drawing).

A front dashboard 7 is provided at the front side in the cab 6. Although not shown in the drawing, the front dashboard 7 is provided with an instrument panel to which meters and gauges including a speedometer, a tachometer, a fuel gauge, an engine water temperature gauge and the like are attached.

While checking the speedometer, tachometer and the like of the instrument panel, the operator drives the dump truck 1 by manipulating a handle 8 disposed at the left side of the front dashboard 7, an accelerator, a brake, a shift lever and the like (not shown in the drawing).

An auxiliary seat 9 for a trainer is provided at the rear left side of the front dashboard 7. An operator seat 10 as a driver seat for the operator is provided at the back of the handle 8. The auxiliary seat 9 is also referred to as trainer seat.

2. Structure of Operator Seat 10

Figure 4:
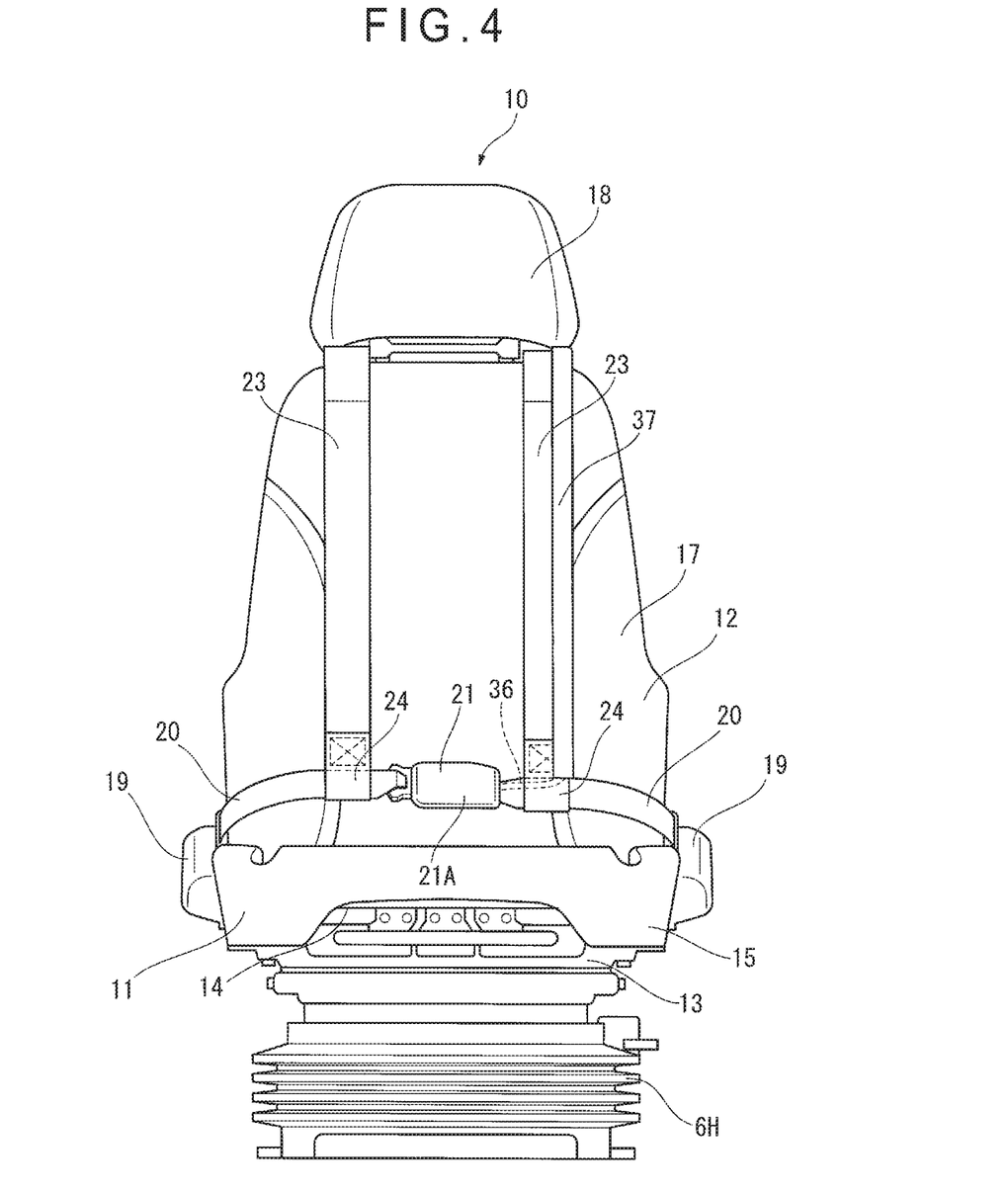
FIG. 4 is a front elevational view illustrating a structure of a driver seat for an operator according to the exemplary embodiment.
Figure 5:
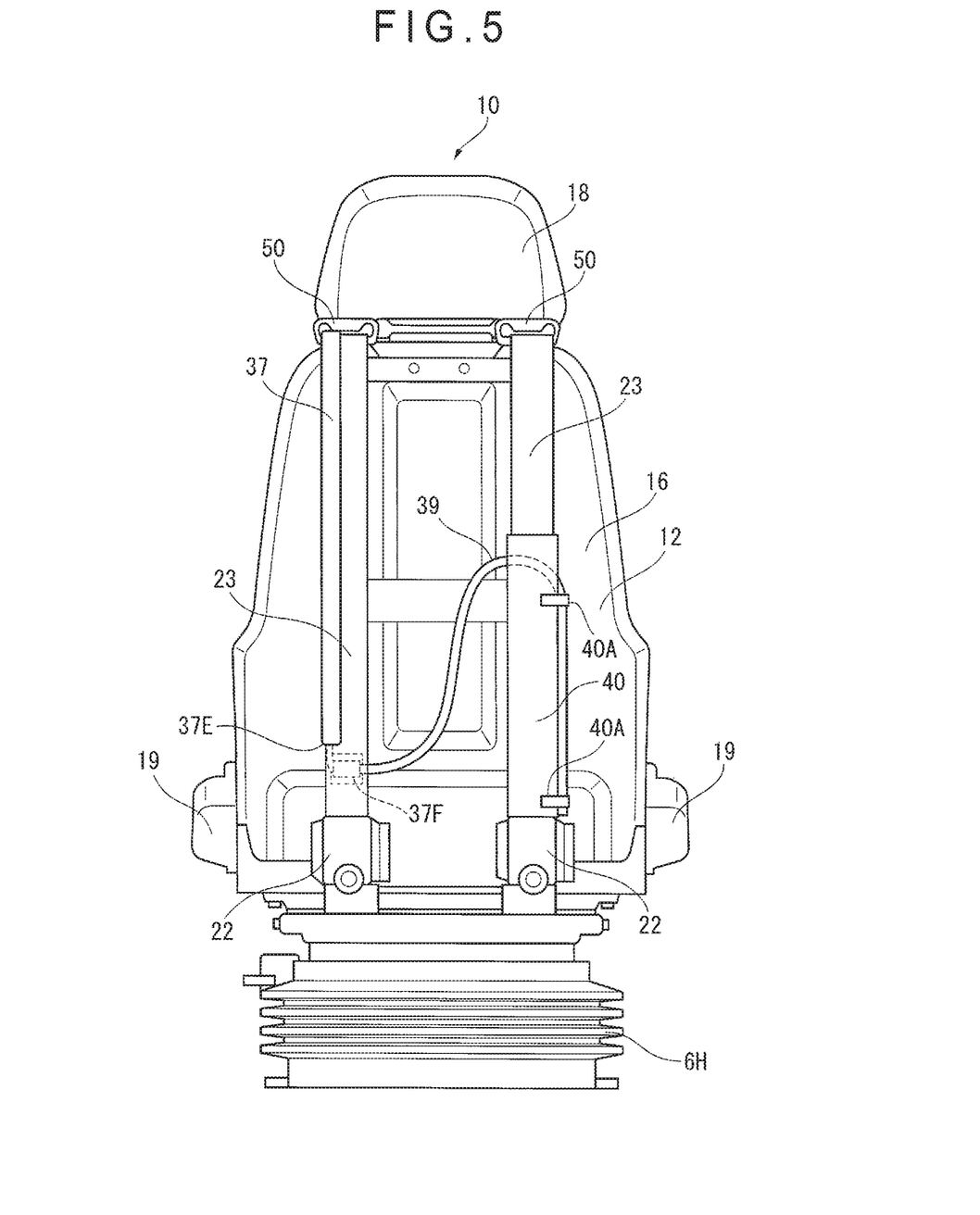
FIG. 5 is a rear view illustrating the structure of the driver seat for an operator according to the exemplary embodiment.

As shown in FIGS. 4 and 5, the operator seat 10 is provided on a suspension 6H disposed on a floor board of the cab 6. The operator seat 10 includes a seat section 11 and a backrest 12.

The seat section 11 is placed on the suspension 6H. Although not shown in the drawing, the seat section 11 is provided by attaching a cushion 14 in the form of a sponge made of urethane foam or the like to a base 13 disposed on the suspension 6H and covering the cushion 14 with a seat cloth 15.

The backrest 12 is erected at the rear-side end of the seat section 11 and supports a back of the operator. The backrest 12 includes a support plate 16 erected at the back of the backrest 12, a cushion attached to the front face of the support plate 16 and a seat cloth 17 covering the cushion. A headrest 18 is provided at the upper end of the backrest 12.

A first retractor 19 is provided to each side of the seat section 11. Proximal ends of left and right hip belts 20 are connected to the first retractors 19 on a one-on-one basis. Each of the left and right hip belts 20 can be wound by the first retractors 19.

A fastener 21 is provided to the distal ends of the hip belts 20. The fastener 21 includes a buckle 21A provided at a distal end of one of the hip belts 20 and a tongue plate (not shown in the drawing) provided at a distal end of the other one of the hip belts 20. When the buckle 21A and the tongue plate are fastened, a hipbone area of the operator sitting on the seat section 11 is held.

Each of the first retractors 19 is an automatic locking retractor (ALR). During the operation, when the dump truck 1 is applied with vertical impact, each of the first retractors 19 draws the hip belt 20, stops drawing the hip belt 20, and locks the hip belt 20, so that the hipbone area of the operator is held, which prevents the operator from being dropped off from the operator seat 10.

As shown in FIG. 5, a second retractor 22 is provided on left and right sides at the lower end of the rear surface of the backrest 12, and the proximal ends of the left and right shoulder belts 23 are connected to the second retractors 22 on a one-on-one basis. The shoulder belt 23 is made of a material including polyester and the like. Each of the shoulder belts 23 can be wound by the corresponding second retractor 22.

As shown in FIG. 4, an attachment ring 24 is provided to a distal end of each of the shoulder belts 23, and the hip belt 20 is inserted into each of the attachment rings 24. The attachment ring 24 is provided by folding back the distal end of the shoulder belt 23 and seaming the distal end of the shoulder belt 23 with the shoulder belt 23 so as to form a ring. Since the hip belt 20 is integrated with the shoulder belt 23, the shoulder area of the operator is held together with the hipbone area of the operator.

During the operation of the dump truck 1, when generation of acceleration in a vertical or front-back direction or occurrence of inclination of the dump truck 1 of at least a predetermined degree is detected, each of the second retractors 22 stops winding and locks the shoulder belt 23 to hold the shoulder area of the operator, which prevents the operator from being hurled forward. Specifically, the second retractor 22 is an emergency locking retractor (ELR), where, although the shoulder belt 23 is manually drawn, when the shoulder belt 23 is rapidly drawn upon being applied with impact or the like accompanied with generation of acceleration of at least a predetermined degree, the shoulder belt 23 is locked by each of the second retractors 22 to hold the shoulder area of the operator, which prevents the operator from being dropped off from the operator seat 10.

The four-point seat belt of this exemplary embodiment includes the above-described hip belts 20, shoulder belts 23, first retractors 19, second retractors 22, buckle 21A, and tongue plate. It should be noted that this exemplary embodiment is applicable to not only the four-point seat belt but also to a five-point seat belt in which a belt is drawn from a crotch portion of an operator and fastened with a buckle.

3. Structure of Fastened-State Detector 30

Figure 6:
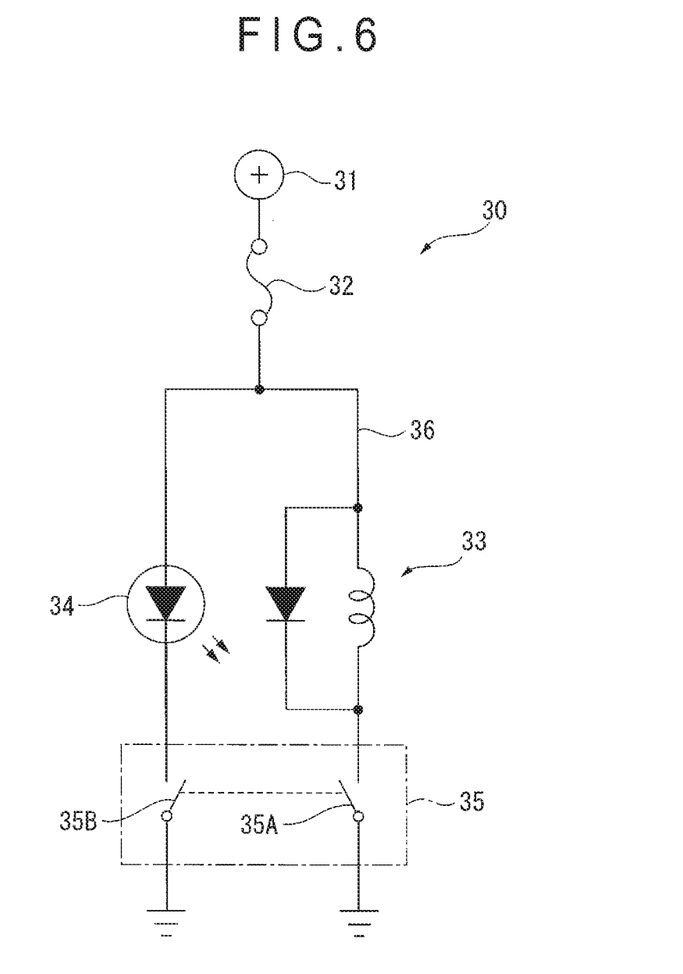
FIG. 6 is a circuit diagram illustrating a structure of a fastened-state detector according to the exemplary embodiment.

A fastened-state detector 30 detects a fastened state of the buckle 21A provided at the distal end of one of the hip belts 20 with the tongue plate provided at the distal end of the other one of the hip belts 20.

As shown in FIG. 6, the fastened-state detector 30 includes a power source 31, a fuse 32, a seat belt tension reducer solenoid 33, a seat belt warning light 34, a buckle switch 35 and a wire harness 36.

The power source 31 supplies power to the seat belt tension reducer solenoid 33 and the seat belt warning light 34.

When excessive voltage is supplied from the power source 31, the fuse 32 disconnects by itself to prevent breakage of the seat belt tension reducer solenoid 33 and the seat belt warning light 34.

The seat belt tension reducer solenoid 33 is provided for the purpose of reducing the fastening power of the seat belt applied to the operator wearing the seat belt and reducing a feeling of pressure for the operator held by the seat belt.

The seat belt warning light 34 includes light-emitting diode and the like, and is placed on the instrument panel of the front dashboard 7, so as to inform the operator of a wearing state of the seat belt and give a warning to urge the operator to wear the seat belt in a visual manner. The seat belt warning light 34 is connected in parallel with the seat belt tension reducer solenoid 33.

The buckle switch 35 as a detector main body is housed in the buckle 21A. The buckle switch 35 includes a switch 35A and a switch 35B. A first end of the switch 35A is connected to the seat belt tension reducer solenoid 33 and a second end of the switch 35A is grounded. A first end of the switch 35B is connected to the seat belt warning light 34 and a second end of the switch 35B is grounded.

The switch 35A and the switch 35B are configured to operate in conjunction with each other. When the buckle 21A and the tongue plate are fastened, the switch 35A short-circuits and the switch 35B is released, so that the power to the seat belt warning light 34 is shut off and the seat belt warning light 34 is turned off.

In contrast, when the operator does not wear the seat belt, the switch 35B short-circuits, and the seat belt warning light 34 remains to be turned on.

The wire harness 36 as the signal line establishes electrical continuity between the respective components of the fastened-state detector 30.

The wire harness 36 is drawn from the buckle switch 35 (not shown in FIG. 4) housed in the buckle 21A, and extends along the inside of the hip belt 20 as shown in FIG. 4. Further, the wire harness 36 together with the hip belt 20 passes through the attachment ring 24 to be housed in a bag-shaped section 37.

Figure 7:
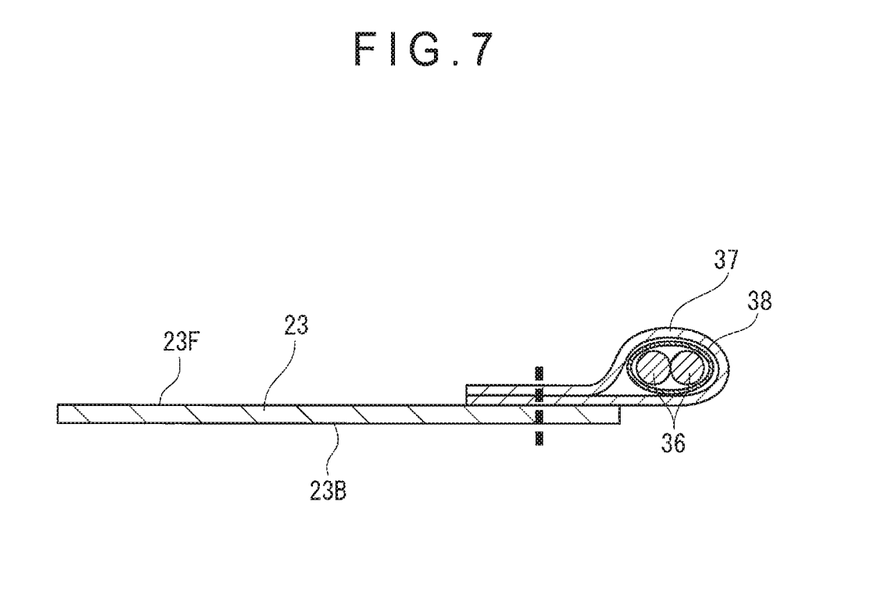
FIG. 7 is a cross-sectional view illustrating a structure of each of a shoulder belt, signal lines and a bag-shaped section according to the exemplary embodiment.

FIG. 7 is a cross-sectional view illustrating a structure of a part in which the shoulder belt 23 and the bag-shaped section 37 are integrated together. According to this exemplary embodiment, the bag-shaped section 37 is integrated with only the shoulder belt 23 located at the left side. For instance, a nylon cloth and the like are used as a material for the bag-shaped section 37. As shown in FIG. 7, the bag-shaped section 37 is formed by folding back a cloth in the shape of a belt along the longitudinal direction thereof, overlapping the end portions of the cloth so that space is defined between the overlapped cloth, and seaming the end portions of the cloth with the shoulder belt 23 so that the end portions of the cloth are integrated with the shoulder belt 23 in the drawing direction of the shoulder belt 23. In the space defined in the overlapped cloth of the bag-shaped section 37, as shown in FIG. 7, the two wire harnesses 36 each having an outer circumference covered with an insulator are inserted into a rubber cover 38 and housed therein. The bag-shaped section 37 is seamed at a front surface 23F of the shoulder belt 23. A rear surface 23B of the shoulder belt 23 is in contact with a body of the operator, and the bag-shaped section 37 is not directly brought into contact with the body of the operator.

As shown in FIG. 4, a length of the bag-shaped section 37 in the longitudinal direction thereof is such that a distal end of the shoulder belt 23 in a winding direction thereof extends toward the vicinity of the attachment ring 24. As shown in FIG. 5, the bag-shaped section 37 is integrated with the shoulder belt 23 at a position that the shoulder belt 23 is wound to the greatest extent possible by the second retractor 22, so that the bag-shaped section 37 is kept from being wound by the second retractor 22. When the shoulder belt 23 is wound to the greatest extent possible by the second retractor 22, it is supposed that the shoulder belt 23 is not drawn from the second retractor 22 and the operator does not sit on the operator seat 10. In contrast, when the shoulder belt 23 is drawn to the greatest extent possible from the second retractor 22, it is supposed that the seat belt is unwound in order for an operator to attach the seat belt, or an operator who wears the seat belt is a large person and therefore it is necessary to draw the shoulder belt 23 to the greatest extent possible.

The wire harness 36 is separated from the shoulder belt 23 at a proximal-side end 37E of the bag-shaped section 37 and inserted into a conduit 39.

The conduit 39 is a bellows-shaped flexible hose. The conduit 39 passes through a cylindrical portion 37F formed on the rear surface 23B (not shown in FIG. 5) of the shoulder belt 23 below the proximal-side end 37E of the bag-shaped section 37 to be locked with a support member 40 that is inserted through the shoulder belt 23 having no bag-shaped section 37 (i.e., the shoulder belt 23 located at the right side in this exemplary embodiment).

The support member 40 is a tubular body having a rectangular cross section into which the shoulder belt 23 is inserted with a clearance so as to be movable inside the support member 40. Accordingly, it is possible to smoothly draw and wind the shoulder belt 23. Further, a locking portion 40A is formed at two positions on the outer circumferential surface of the support member 40 so that the conduit 39 is locked with the locking portions 40A.

Figure 8:
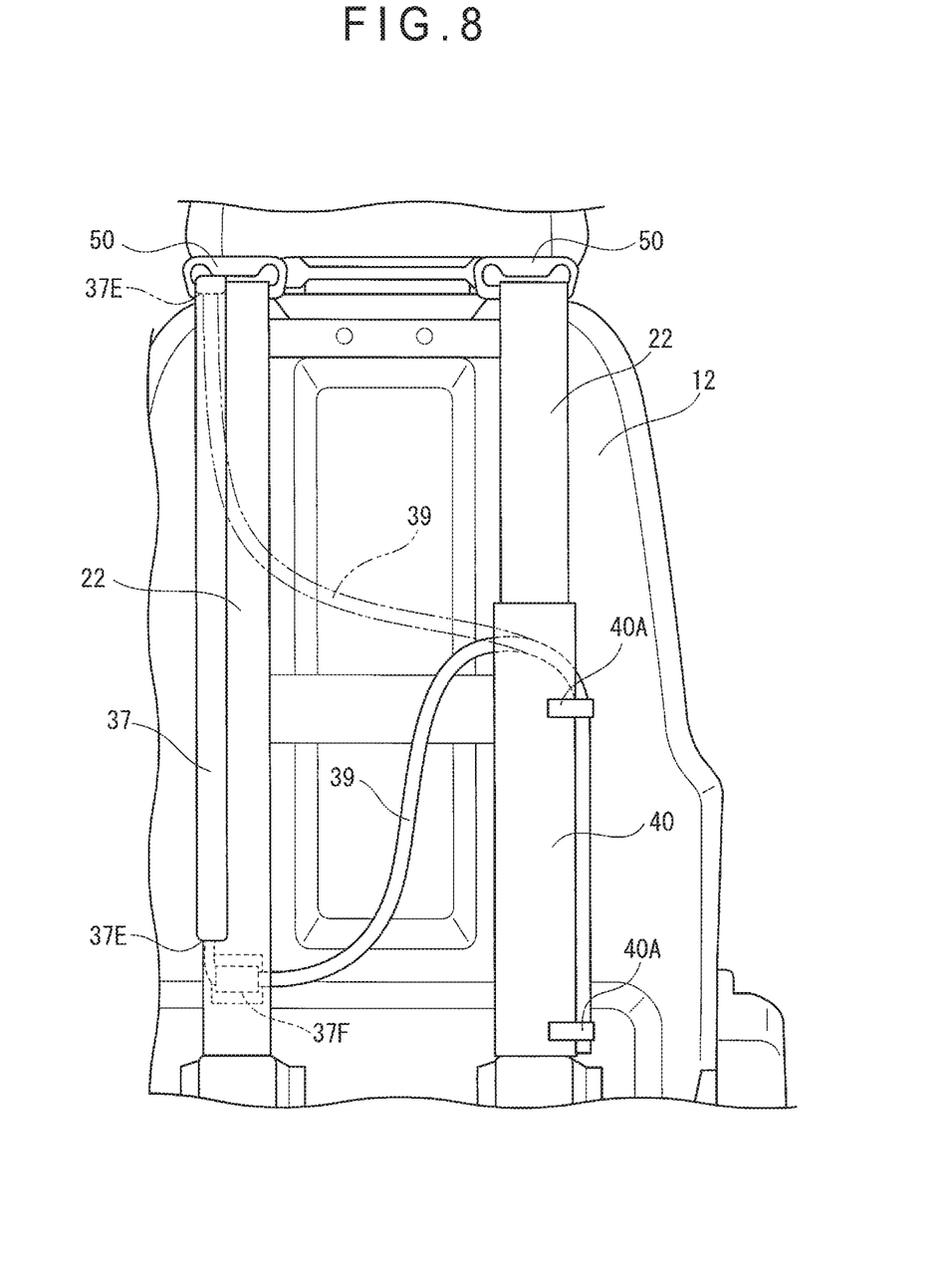
FIG. 8 is a partial rear view illustrating a structure of a conduit attached to a rear surface of the driver seat for an operator and its vicinity according to the exemplary embodiment.

The conduit 39 is attached to a rear surface of the backrest 12 with a slack as shown in FIGS. 5 and 8. Chain double-dashed lines shown in FIG. 8 illustrate a state of the conduit 39 when the shoulder belt 23 is drawn to the greatest extent possible from the second retractor 22, and solid lines shown in FIG. 8 illustrate a state of the conduit 39 when the shoulder belt 23 is wound to the greatest extent possible by the second retractor 22. The conduit 39 moves upward when the shoulder belt 23 is drawn as illustrated by the chain double-dashed lines shown in FIG. 8, and moves downward when the shoulder belt 23 is wound as illustrated by the solid lines shown in FIG. 8. The length of the conduit 39 is such that the conduit 39 reaches a guide member 50 provided to the upper end of the backrest 12. Incidentally, although the wire harness 36 is inserted into the conduit 39 (bellows-shaped hose) in this exemplary embodiment, the invention is not limited thereto. Other structures may be adopted as long as the shoulder belt 23 is movable (i.e., drawn and wound). For example, the wire harness 36 may be inserted into a spiral tube formed by deforming a hose in a spiral manner.

Even when the shoulder belt 23 is integrated with the bag-shaped section 37 and the shoulder belt 23 is drawn to the greatest extent possible or wound to the greatest extent possible, the wire harness 36 is visible while being housed inside the bag-shaped section 37 when the operator seat 10 is seen from the front. Namely, the position at which the wire harness 36 is separated from the shoulder belt 23 using the conduit 39 (i.e., the proximal-side end 37E) is always located on the rear surface of the backrest 12. Accordingly, while ensuring excellent appearance of the seat belt, it is possible to reliably hold the shoulder area and the hip area of the operator regardless of the size of operator (i.e., large or small), and prevent occurrence of breakage such as disconnection of the wire harness 36.

The bag-shaped section 37 which is integrated with the shoulder belt 23 is integrated with the front surface 23F of the shoulder belt 23. Therefore, the bag-shaped section 37 is not brought into direct contact with the body of the operator. Accordingly, the rear surface 23B of the shoulder belt 23, namely a smooth surface is brought into contact with the body of the operator. The operator wearing the seat belt can drive the working vehicle without feeling uncomfortable.

4. Structure of Guide Member 50

As shown in FIG. 8, the guide member 50 is projected at each side on the upper end of the backrest 12. The guide member 50 guides the shoulder belt 23 in order to prevent the shoulder belt 23 from being dropped off from the upper end of the backrest 12 when the shoulder belt 23 is drawn or wound and while the operator is held.

Figure 9:
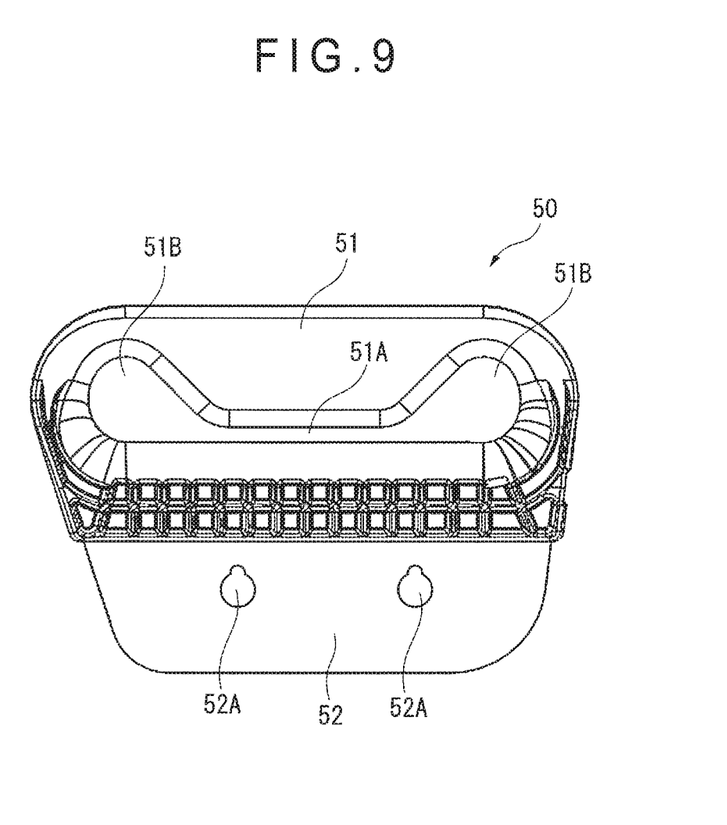
FIG. 9 is a front elevational view illustrating a structure of a guide member according to the exemplary embodiment.

FIG. 9 is a front elevational view illustrating a structure of the guide member 50. As shown in FIG. 9, the guide member 50 includes a belt insertion portion 51 and a fixing part 52.

The belt insertion portion 51 is, for example, a molding made of resin such as nylon. A through hole 51A, through which the shoulder belt 23 is inserted, is formed at approximately the center of the belt insertion portion 51. The through hole MA is a groove-shaped hole larger than the cross section of the shoulder belt 23. An enlarged section 51B is formed at each side end of the through hole MA as the upwardly-extended through hole 51A.

The bag-shaped section 37 through which the wire harness 36 passes is inserted through the enlarged section 51B. The enlarged section 51B is sized such that a sufficient clearance for the passage of the bag-shaped section 37 is secured. Although the enlarged section 51B is provided at two positions, i.e., at each side end of the through hole 51A in this exemplary embodiment, the invention is not limited thereto. When a position for attaching the bag-shaped section 37 is determined in advance, the enlarged section may be provided at one of the side ends of the through hole 51A. Further, the enlarged section may be provided only to a guide member through which the shoulder belt 23 having the bag-shaped section 37 passes (i.e., the guide member through which the shoulder belt 23 located at the left side passes as described above in this exemplary embodiment).

The fixing part 52 is a steel plate. Two fixation holes 52A are formed at the center of the fixing part 52.

The guide member 50 is made by insert molding in which a metal piece of the fixing part 52 is inserted at the time of the injection molding of the belt insertion portion 51. The belt insertion portion 51 and the fixing part 52 are firmly integrated together.

Figure 10:
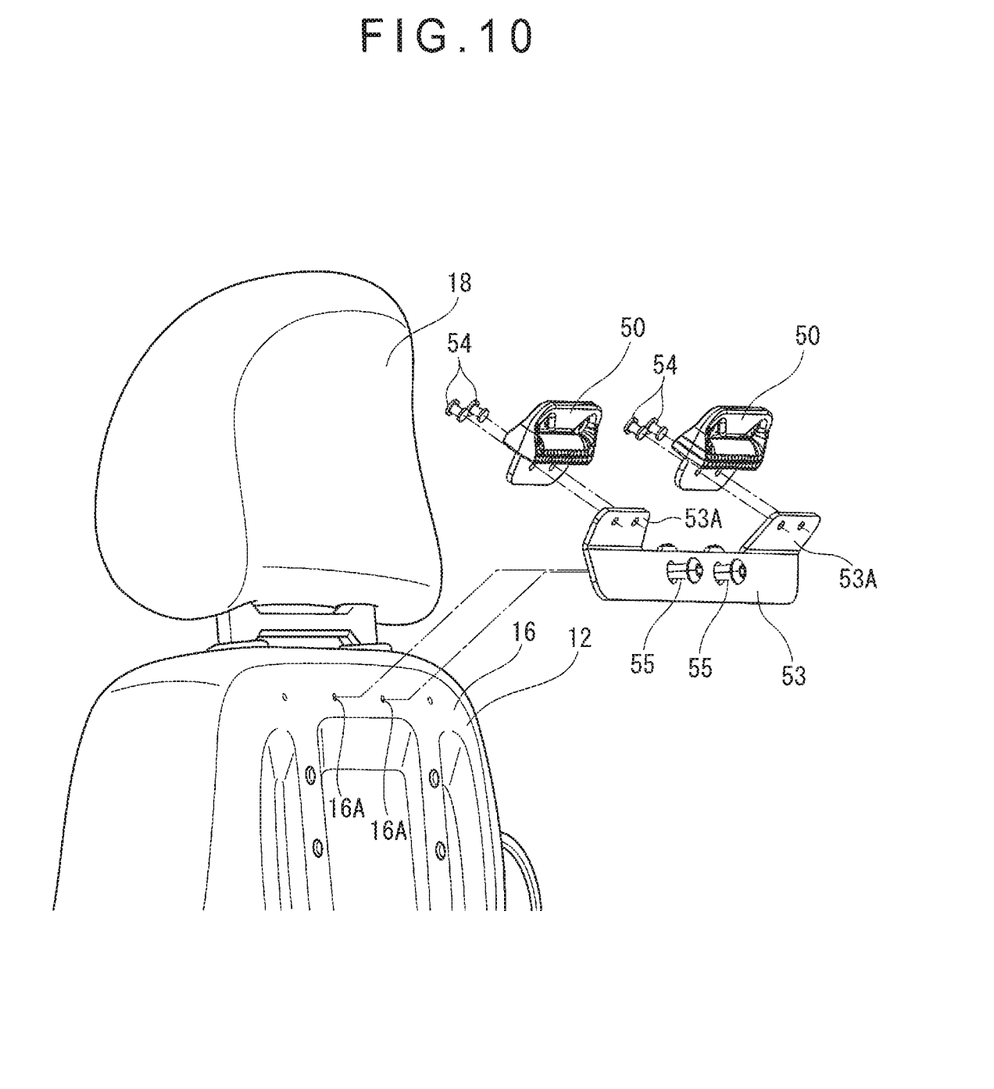
FIG. 10 is an exploded perspective view illustrating an attaching structure of the guide member according to the exemplary embodiment.

The guide member 50 is fixed to the backrest 12 by the following procedure. First, as shown in FIG. 10, the guide member 50 is fixed to a base member 53 having tongue pieces 53A protruding toward both side ends of the headrest 18 using screws 54. Further, screws 55 which are inserted through the base member 53 are threadably fixed to the screw holes 16A formed in advance on the support plate 16 of the backrest 12. The base member 53 may be, for example, a steel plate.

5. Operation and Effect of Exemplary Embodiment

According to this exemplary embodiment, the following operation and effect can be achieved.

Since the fastened-state detector 30 includes the buckle switch 35, the wire harness 36 and the bag-shaped section 37, whether or not the buckle 21A and the tongue plate are fastened can be detected through the electrical continuity of the buckle switch 35. Further, the wire harness 36 can pass through the bag-shaped section 37, and it is possible to turn on/off the seat belt warning light 34 from a remote position. Accordingly, even when the buckle 21A housing the buckle switch 35 is positioned away from the backrest 12 or the seat section 11 of the operator seat 10 as in the four-point seat belt, it is possible to give a warning to urge the operator to wear the seat belt.

Since the guide member 50 is provided at the upper portion of the backrest 12, the shoulder belt 23 can be inserted through the groove-shaped through hole 51A, and the bag-shaped section 37 of the fastened-state detector 30 can pass through the enlarged section 51B. Accordingly, when the shoulder belt 23 is drawn or wound, the bag-shaped section 37 is smoothly inserted through the guide member 50. Consequently, it is possible to prevent occurrence of breakage such as disconnection of the wire harness 36 and draw/wind the shoulder belt 23.

The bag-shaped section 37 has a length such that the bag-shaped section 37 is integrated with the shoulder belt 23 in a state that the shoulder belt 23 is wound to the greatest extent possible by the second retractor 22, it is possible to prevent the bag-shaped section 37 from being caught by the second retractor 22 and prevent occurrence of breakage such as disconnection of the wire harness 36.

Since the conduit 39 configured to house the wire harness 36 separated from the bag-shaped section 37 is attached to the rear surface of the backrest 12 and the conduit 39 is movable in accordance with the drawing or winding operation of the shoulder belt 23, it is possible to perform the drawing operation and winding operation of the shoulder belt 23 without applying tension in the drawing direction to the wire harness 36.

6. Modification of Exemplary Embodiment

It should be appreciated that the scope of the invention is not limited to the above-described exemplary embodiment(s) but includes modifications and improvements as long as such modifications and improvements are compatible with the invention.

For example, the operator seat 10 of the present invention is used for the dump truck 1 in the above exemplary embodiment. However, the scope of the invention is not limited thereto. The dump truck may be an articulated dump truck. The operator seat 10 of the invention may be used for other construction machines including working vehicles such as a hydraulic excavator and a wheel loader, and industrial vehicles such as a forklift as working vehicles.

Although the operator is informed of the unworn state of the seat belt by the seat belt warning light 34 in the above exemplary embodiment, the invention is not limited thereto. Sound or the like may be used to inform the operator of the unworn state of the seat belt. Namely, a sound generator configured to urge the operator to wear the seat belt using sound may be provided in addition to the seat belt warning light 34.

Further, the specific arrangements and configurations may be altered in any manner as long as the modifications and improvements are compatible with the invention.

The invention claimed is:

1. A driver seat for an operator provided to a working vehicle, the driver seat comprising:
   a seat section on which an operator sits;
   a backrest erected at the back of the seat section, configured to support a back of the operator sitting on the seat section;
   a pair of first retractors provided to left and right sides of the seat section;
   a pair of hip belts each having a proximal end connected to each of the pair of first retractors, the pair of hip belts being configured to hold a hipbone area of the operator;
   a fastener configured to fasten the pair of hip belts;
   a pair of second retractors provided to a rear surface of the backrest;
   a pair of shoulder belts each having a proximal end connected to each of the pair of second retractors and a distal end attached to each of the pair of hip belts, the pair of shoulder belts being configured to hold a shoulder area of the operator; and
   a fastened-state detector configured to detect whether or not the fastener is fastened, wherein
   the fastened-state detector comprises:
      a detector main body configured to detect whether or not the fastener is fastened through electrical continuity;
      a signal line connected to the detector main body; and
      a bag-shaped section integrated with one of the pair of shoulder belts in a drawing direction of the shoulder belt, the bag-shaped section housing the signal line.

2. The driver seat for an operator according to claim 1, further comprising:
   a pair of guide members each having a groove-shaped hole through which the shoulder belt passes, the guide members being provided to an upper portion of the backrest, wherein
   an enlarged section through which the bag-shaped section passes is provided to the groove-shaped hole of one of the guide members.

3. The driver seat for an operator according to claim 1, wherein
   the bag-shaped section is integrated with the shoulder belt between a position at which the shoulder belt is wound by the second retractor to the greatest extent possible and a position at which the shoulder belt is drawn to the greatest extent possible.

4. The driver seat for an operator according to claim 3, further comprising:
   a conduit housing a signal line separated from the bag-shaped section, the conduit being provided to the rear surface of the backrest, and
   the conduit is configured to be movable in accordance with a drawing operation or a winding operation of the shoulder belt.

5. A dump truck comprising the driver seat for an operator according to claim 1.

* * * * *